(12) United States Patent
Cooperman (10) Patent No.: US 11,188,064 B1
(45) Date of Patent: Nov. 30, 2021

(54) PROCESS FLOW ABNORMALITY DETECTION SYSTEM AND METHOD

(71) Applicant: IXDen Ltd., Tel Aviv-Jaffa (IL)

(72) Inventor: Leonid Cooperman, Rishon LeZion (IL)

(73) Assignee: IXDEN LTD., Rishon Lezion (IL)

( * ) Notice: Subject to any disclaimer, the term of this patent is extended or adjusted under 35 U.S.C. 154(b) by 0 days.

(21) Appl. No.: 17/306,969

(22) Filed: May 4, 2021

(51) Int. Cl.
*G05B 23/02* (2006.01)

(52) U.S. Cl.
CPC ....... *G05B 23/0235* (2013.01); *G05B 23/024* (2013.01); *G05B 23/0248* (2013.01); *G05B 23/0264* (2013.01); *G05B 23/0281* (2013.01); *G05B 23/0289* (2013.01)

(58) Field of Classification Search
CPC .. G06N 5/003; G06F 16/285; G05B 23/0235; G05B 23/024; G05B 23/0248; G05B 23/0264; G05B 23/0281; G05B 23/0289
See application file for complete search history.

(56) References Cited

U.S. PATENT DOCUMENTS

| | | | | |
|---|---|---|---|---|
| 7,349,746 | B2 * | 3/2008 | Emigholz | C10G 11/187 700/21 |
| 2008/0167842 | A1 * | 7/2008 | Cochran | G05B 23/0281 703/2 |
| 2008/0281557 | A1 * | 11/2008 | Emigholz | G05B 23/0281 702/179 |
| 2009/0327173 | A1 * | 12/2009 | Lee | G06N 5/048 706/12 |
| 2012/0304007 | A1 | 11/2012 | Hanks et al. | |
| 2014/0278465 | A1 | 9/2014 | Steiner | |
| 2015/0346706 | A1 | 12/2015 | Gendelman | |
| 2017/0264629 | A1 | 9/2017 | Wei et al. | |
| 2018/0059641 | A1 * | 3/2018 | Morimoto | G05B 19/4062 |
| 2018/0224821 | A1 | 8/2018 | Lamparter et al. | |
| 2018/0348728 | A1 | 12/2018 | Ota et al. | |
| 2019/0118443 | A1 * | 4/2019 | Asaoka | B29C 45/76 |
| 2020/0393810 | A1 * | 12/2020 | Kempf | G05B 23/0267 |
| 2021/0018904 | A1 * | 1/2021 | Hada | G06N 20/00 |

FOREIGN PATENT DOCUMENTS

| | | |
|---|---|---|
| JP | 5151556 B2 | 2/2013 |
| WO | 2012038355 A1 | 3/2012 |

* cited by examiner

*Primary Examiner* — Kyle R Quigley (57) ABSTRACT

A method for automatically detecting an abnormal process flow for a process in an industrial control system (ICS) comprises providing process flow (PF) strings that define normal PFs for processes in the ICS, each of the PF strings defining a time-ordered sequence of events that is a time-ordered recurring sequence of learned events associated with learned changes between learning values of parameters that affect an operation of the ICS, wherein a respective PF string of the PF strings includes an attributed process flow node that represents an attributed event and one or more attributes that are associated therewith. The method further comprises: obtaining monitoring values of the parameters, analyzing the monitoring values to detect monitored events that are associated with monitored changes between monitoring values of the parameters, and detecting the abnormal process flow upon determining a lack of conformance of a monitored event with one of the PF strings.

20 Claims, 4 Drawing Sheets

Fig. 4

PROCESS FLOW ABNORMALITY DETECTION SYSTEM AND METHOD

TECHNICAL FIELD

The invention relates to a process flow abnormality detection system and method.

BACKGROUND

Industrial Control Systems (ICS's) usually utilize many Industrial Controllers, each of which receive data from a large number of sensors and manage some actuators. Accordingly, the process flows of the processes in ICS's are usually extremely complex. It would be advantageous, notwithstanding the complexity of process flows in an ICS, to detect abnormal process flows in the ICS, and thereby better monitor the ICS for operational failures and security breaches.

Thus, there is a need in the art for a new process flow abnormality detection system and method.

References considered to be relevant as background to the presently disclosed subject matter are listed below. Acknowledgement of the references herein is not to be inferred as meaning that these are in any way relevant to the patentability of the presently disclosed subject matter.

U.S. Patent Application Publication No. 2012/0304007 ("Hanks et al."), published on Nov. 29, 2012, discloses methods and apparatus for use in identifying abnormal behavior in a control system. Operating events associated with a control system are received, and an actual behavior of the control system is determined based on the received operating events. The actual behavior is compared to expected behavior to determine whether the actual behavior differs from the expected behavior. The expected behavior includes a correlation between a plurality of operating events associated with the control system. The expected behavior is updated based on an indication of whether the actual behavior is abnormal from a user.

U.S. Patent Application Publication No. 2014/0278465 ("Steiner"), published on Sep. 18, 2014, describes a contact center along with various methods and mechanisms for administering the same. In particular, the contact center may be configured to execute a work assignment engine and the contact center may also contain a health monitoring module that is configured to monitor events in the work assignment engine, compare the monitored events with a grammar defining expected events and an expected sequence of the expected events, and determine whether the work assignment engine is behaving appropriately based on the comparison.

U.S. Patent Application Publication No. 2018/0348728 ("Ota et al."), published on Dec. 6, 2018, discloses a process analysis apparatus according to an aspect that may include a first acquisition unit that acquires a plurality of pieces of state data related to states of a plurality of mechanisms that constitute a manufacturing line, a second acquisition unit that acquires a control program for controlling an operation of the manufacturing line, a first analyzer that analyzes the acquired plurality of pieces of state data so as to identify a connection state between the plurality of mechanisms, a second analyzer that analyzes the acquired control program so as to identify an order relationship between the plurality of mechanisms, and a relationship identifying unit that identifies a causal relationship between the plurality of mechanisms in a process that is carried out on the manufacturing line, based on the identified connection state and order relationship.

U.S. Patent Application Publication No. 2015/0346706 ("Gendelman"), published on Dec. 3, 2015, provides a computerized method for automatic monitoring of control systems. The method may comprise receiving electronic measurement values, measured on one or more conductors of computerized control devices, where the conductors may be a system bus conductor and/or an input-output line of a programmable logic controller. The method may comprise automatically calculating normal data patterns based on an analysis of the electronic measurement values. The method may comprise matching between new electronic measurement values measured on the computerized control devices and the normal data patterns to automatically detect abnormal data patterns. The method may comprise sending automatically an abnormal operation alert in response to the abnormal data patterns.

U.S. Patent Application Publication No. 2018/0224821 ("Lamparter et al."), published on Aug. 9, 2018, discloses a method of operating an intelligent programmable logic controller (PLC) as part of a production process within an automation system including the intelligent PLC receiving automation system data and a semantic context model comprising a plurality of ontologies providing formal specifications of conceptual entities associated with the automation system. The intelligent PLC creates one or more semantic annotations for the automation system data using the semantic context model. These semantic annotations are stored along with the automation system data in a non-volatile storage medium included in the intelligent PLC.

U.S. Patent Application Publication No. 2017/0264629 ("Wei et al."), published on Sep. 14, 2017, discloses a system for threat detection in an industrial production environment comprising a programmable logic controller. This programmable logic controller includes a process image updated according to a scan cycle with process data associated with one or more field devices, a program configured to operate the one or more field devices using the process data, and one or more function blocks. These function blocks are configured to monitor the process data in the process image during each scan cycle, and identify a possible cyberattack based on the process data.

Japanese Patent No. 5151556, published on Feb. 27, 2013, discloses a process analysis apparatus that analyzes a relationship between a plurality of signals input and output substantially periodically. Signals to be analyzed include, for example, control signals and response signals that are input and output between the manufacturing apparatus and the control apparatus in a production line that includes a plurality of manufacturing apparatuses and a control apparatus that controls these manufacturing apparatuses. When the production method is performed in such a production line, signals input/output between the plurality of manufacturing apparatuses and the control apparatus are exchanged substantially periodically.

International Patent Application Publication No. 2012/038355 ("Stoeter et al."), published on Mar. 29, 2012, discloses identifying related data items out of an initial or base set of data items representative of a plurality of tangible assets of an Industrial Automation and Control System of a critical industrial process or system. Each data item comprises a number of parameters, e.g. relating to location or type of the asset, or to the role of the asset in the industrial process or system, as well as corresponding parameter values. The parameters are standardized in the sense that corresponding information from different assets is assigned to a same parameter. Increasingly refined sets of related data items are identified iteratively by selecting identifying parameters and parameter values.

General Description

In accordance with a first aspect of the presently disclosed subject matter, there is provided a process flow abnormality detection system for automatically detecting an abnormal process flow for a process of processes in an industrial control system (ICS), the process flow abnormality detection system comprising a processing circuitry configured to: provide a process flow model comprised of process flow strings that define normal process flows for the processes, wherein each process flow string of the process flow strings defines a time-ordered sequence of events that is a time-ordered recurring sequence of learned events, each learned event of the learned events being indicative of at least one learned change between two or more respective learning values of a respective parameter of parameters affecting an operation of the ICS that meets an event detection criterion, wherein each process flow node in a respective process flow string of the process flow strings represents a respective event of the events in the respective process flow string, and wherein an attributed process flow node of process flow nodes in the respective process flow string represents one or more attributes that are associated with an attributed event that is represented by the attributed process flow node; and monitor process flows of the processes by: obtaining monitoring values of the parameters; analyzing the monitoring values to detect monitored events, each monitored event of the monitored events being detected upon at least one monitored change between two or more respective monitoring values of the monitoring values of a respective parameter of the parameters that meets the event detection criterion; determining conformance of the monitored events with the process flow strings; and upon determining a lack of conformance of one of the monitored events with any one of the process flow strings, detecting the abnormal process flow.

In some cases, the respective parameter is a fixed parameter or an enumerable parameter, the enumerable parameter having a plurality of categorical parameter values, and the event detection criterion is a status change of a status of the respective parameter.

In some cases, the respective parameter is a variable parameter, and the event detection criterion is that the at least one learned change is statistically significant.

In some cases, the respective parameter is a variable parameter, and the event detection criterion is that the at least one monitored change is statistically significant.

In some cases, the at least one learned change is statistically significant upon the at least one learned change resulting in at least one of the following: (a) a slope change between the respective learning values of the respective parameter that is greater than a statistically significant slope change, (b) an amplitude change between the respective learning values of the respective parameter that is greater than a statistically significant amplitude change, (c) a number of consecutive changes in the respective learning values of the respective parameter that is greater than a statistically significant number of consecutive changes, or (d) a rate of changes in the respective learning values of the respective parameter that is greater than a statistically significant change rate.

In some cases, the at least one monitored change is statistically significant upon the at least one monitored change resulting in at least one of the following: (a) a slope change between the respective monitoring values of the respective parameter that is greater than a statistically significant slope change, (b) an amplitude change between the respective monitoring values of the respective parameter that is greater than a statistically significant amplitude change, (c) a number of consecutive changes in the respective monitoring values of the respective parameter that is greater than a statistically significant number of consecutive changes, or (d) a rate of changes in the respective monitoring values of the respective parameter that is greater than a statistically significant change rate.

In some cases, another parameter of the parameters is interdependent with the respective parameter, and the event detection criterion is a statistically significant discrepancy between the learned change and another learned change or lack of change between corresponding learning values of the another parameter, the corresponding learning values corresponding to the respective learning values of the respective parameter.

In some cases, another parameter of the parameters is interdependent with the respective parameter, and the event detection criterion is a statistically significant discrepancy between the monitored change and another monitored change or lack of change between corresponding monitoring values of the another parameter, the corresponding monitoring values corresponding to the respective monitoring values of the respective parameter.

In some cases, one of the attributes that is associated with the attributed event is a time duration range between the attributed event and a successive event in the respective process flow string, the successive event being successive to the attributed event in the respective process flow string, and the time duration range being indicative of a range of time durations between the attributed event and the successive event over iterations of the time-ordered recurring sequence of learned events that is represented by the respective process flow string.

In some cases, the time duration range is determined in accordance with a statistical analysis by fitting the time durations between the attributed event and the successive event over the iterations to a known distribution.

In some cases, one of the attributes that is associated with the attributed event is a range of changes in slope between successive instances of the attributed event over iterations of the time-ordered recurring sequence of learned events that is represented by the respective process flow string, wherein a change in slope between the successive instances of the attributed event over two successive iterations of the time-ordered recurring sequence of learned events that is represented by the respective process flow string is a relation between a first slope of the at least one learned change between the respective learning values that results in an occurrence of the attributed event during a first iteration of the two successive iterations and a second slope of the at least one learned change between the respective learning values that results in the occurrence of the attributed event during a second iteration of the two successive iterations.

In some cases, one of the attributes is indicative of a probability of occurrence of each of at least two possible successive events, successive to the attributed event.

In some cases, the processing circuitry is further configured to: analyze the learning values to detect the learned events.

In some cases, the processing circuitry is further configured to: generate a syntax tree, based on an attribute grammar, each syntax tree node in the syntax tree representing a given learned event of the learned events and one or more node characteristics associated with the given learned event, if any.

In some cases, the processing circuitry is configured to recognize a first process flow string of the process flow strings, based on a grammatical parsing of the syntax tree, the first process flow string being a longest time-ordered recurring sequence of learned events in the syntax tree.

In some cases, the processing circuitry is further configured to perform a sub-sequence identification process one or more times, following recognition of the first process flow string, the sub-sequence identification process including: removing the longest time-ordered recurring sequence of learned events from the syntax tree or what remains thereof; and recognizing another process flow string of the process flow strings, if any, based on the grammatical parsing of a remaining part of the syntax tree, the another process flow string being a new longest time-ordered recurring sequence of learned events in the remaining part of the syntax tree, wherein the longest time-ordered recurring sequence is the new longest time-ordered recurring sequence.

In some cases, the processing circuitry is further configured to: continuously verify the process flow strings based on the monitored events; and upon determining that a given process flow string of the process flow strings fails to conform to the monitored events in accordance with a process flow invalidity determination criterion, update the given process flow string based on the monitored events.

In some cases, the processing circuitry is further configured to: update the process flow model to comprise an updated set of process flow strings while monitoring the process flows.

In some cases, the ICS includes one or more industrial controllers, wherein the processing circuitry includes one or more agents that are installed on the one or more industrial controllers, the one or more agents being configured to obtain the learning values and the monitoring values of the parameters.

In accordance with a second aspect of the presently disclosed subject matter, there is provided a process flow abnormality detection method for automatically detecting an abnormal process flow for a process of processes in an industrial control system (ICS), the process flow abnormality detection method comprising: providing a process flow model comprised of process flow strings that define normal process flows for the processes, wherein each process flow string of the process flow strings defines a time-ordered sequence of events that is a time-ordered recurring sequence of learned events, each learned event of the learned events being indicative of at least one learned change between two or more respective learning values of a respective parameter of parameters affecting an operation of the ICS that meets an event detection criterion, wherein each process flow node in a respective process flow string of the process flow strings represents a respective event of the events in the respective process flow string, and wherein an attributed process flow node of process flow nodes in the respective process flow string represents one or more attributes that are associated with an attributed event that is represented by the attributed process flow node; and monitoring process flows of the processes by: obtaining monitoring values of the parameters; analyzing the monitoring values to detect monitored events, each monitored event of the monitored events being detected upon at least one monitored change between two or more respective monitoring values of the monitoring values of a respective parameter of the parameters that meets the event detection criterion; determining conformance of the monitored events with the process flow strings; and upon determining a lack of conformance of one of the monitored events with any one of the process flow strings, detecting the abnormal process flow.

In some cases, the respective parameter is a fixed parameter or an enumerable parameter, the enumerable parameter having a plurality of categorical parameter values, and the event detection criterion is a status change of a status of the respective parameter.

In some cases, the respective parameter is a variable parameter, and the event detection criterion is that the at least one learned change is statistically significant.

In some cases, the respective parameter is a variable parameter, and the event detection criterion is that the at least one monitored change is statistically significant.

In some cases, the at least one learned change is statistically significant upon the at least one learned change resulting in at least one of the following: (a) a slope change between the respective learning values of the respective parameter that is greater than a statistically significant slope change, (b) an amplitude change between the respective learning values of the respective parameter that is greater than a statistically significant amplitude change, (c) a number of consecutive changes in the respective learning values of the respective parameter that is greater than a statistically significant number of consecutive changes, or (d) a rate of changes in the respective learning values of the respective parameter that is greater than a statistically significant change rate.

In some cases, the at least one monitored change is statistically significant upon the at least one monitored change resulting in at least one of the following: (a) a slope change between the respective monitoring values of the respective parameter that is greater than a statistically significant slope change, (b) an amplitude change between the respective monitoring values of the respective parameter that is greater than a statistically significant amplitude change, (c) a number of consecutive changes in the respective monitoring values of the respective parameter that is greater than a statistically significant number of consecutive changes, or (d) a rate of changes in the respective monitoring values of the respective parameter that is greater than a statistically significant change rate.

In some cases, another parameter of the parameters is interdependent with the respective parameter, and the event detection criterion is a statistically significant discrepancy between the learned change and another learned change or lack of change between corresponding learning values of the another parameter, the corresponding learning values corresponding to the respective learning values of the respective parameter.

In some cases, another parameter of the parameters is interdependent with the respective parameter, and the event detection criterion is a statistically significant discrepancy between the monitored change and another monitored change or lack of change between corresponding monitoring values of the another parameter, the corresponding monitoring values corresponding to the respective monitoring values of the respective parameter.

In some cases, one of the attributes that is associated with the attributed event is a time duration range between the attributed event and a successive event in the respective process flow string, the successive event being successive to the attributed event in the respective process flow string, and the time duration range being indicative of a range of time durations between the attributed event and the successive event over iterations of the time-ordered recurring sequence of learned events that is represented by the respective process flow string.

In some cases, the time duration range is determined in accordance with a statistical analysis by fitting the time durations between the attributed event and the successive event over the iterations to a known distribution.

In some cases, one of the attributes that is associated with the attributed event is a range of changes in slope between successive instances of the attributed event over iterations of the time-ordered recurring sequence of learned events that is represented by the respective process flow string, wherein a change in slope between the successive instances of the attributed event over two successive iterations of the time-ordered recurring sequence of learned events that is represented by the respective process flow string is a relation between a first slope of the at least one learned change between the respective learning values that results in an occurrence of the attributed event during a first iteration of the two successive iterations and a second slope of the at least one learned change between the respective learning values that results in the occurrence of the attributed event during a second iteration of the two successive iterations.

In some cases, one of the attributes is indicative of a probability of occurrence of each of at least two possible successive events, successive to the attributed event.

In some cases, the process flow abnormality detection method further comprises: analyzing the learning values to detect the learned events.

In some cases, the process flow abnormality detection method further comprises: generating a syntax tree, based on an attribute grammar, each syntax tree node in the syntax tree representing a given learned event of the learned events and one or more node characteristics associated with the given learned event, if any.

In some cases, the process flow abnormality detection method further comprises: recognizing a first process flow string of the process flow strings, based on a grammatical parsing of the syntax tree, the first process flow string being a longest time-ordered recurring sequence of learned events in the syntax tree.

In some cases, the process flow abnormality detection method further comprises: performing a sub-sequence identification process one or more times, following recognition of the first process flow string, the sub-sequence identification process including: removing the longest time-ordered recurring sequence of learned events from the syntax tree or what remains thereof; and recognizing another process flow string of the process flow strings, if any, based on the grammatical parsing of a remaining part of the syntax tree, the another process flow string being a new longest time-ordered recurring sequence of learned events in the remaining part of the syntax tree, wherein the longest time-ordered recurring sequence is the new longest time-ordered recurring sequence.

In some cases, the process flow abnormality detection method further comprises: continuously verifying the process flow strings based on the monitored events; and upon determining that a given process flow string of the process flow strings fails to conform to the monitored events in accordance with a process flow invalidity determination criterion, updating the given process flow string based on the monitored events.

In some cases, the process flow abnormality detection method further comprises: updating the process flow model to comprise an updated set of process flow strings while monitoring the process flows.

In some cases, the ICS includes one or more industrial controllers, wherein one or more agents are installed on the one or more industrial controllers, the one or more agents being configured to obtain the learning values and the monitoring values of the parameters.

In accordance with a third aspect of the presently disclosed subject matter, there is provided a non-transitory computer readable storage medium having computer readable program code embodied therewith, the computer readable program code, executable by a processing circuitry of a computer to perform a process flow abnormality detection method for automatically detecting an abnormal process flow for a process of processes in an industrial control system (ICS), the process flow abnormality detection method comprising: providing a process flow model comprised of process flow strings that define normal process flows for the processes, wherein each process flow string of the process flow strings defines a time-ordered sequence of events that is a time-ordered recurring sequence of learned events, each learned event of the learned events being indicative of at least one learned change between two or more respective learning values of a respective parameter of parameters affecting an operation of the ICS that meets an event detection criterion, wherein each process flow node in a respective process flow string of the process flow strings represents a respective event of the events in the respective process flow string, and wherein an attributed process flow node of process flow nodes in the respective process flow string represents one or more attributes that are associated with an attributed event that is represented by the attributed process flow node; and monitoring process flows of the processes by: obtaining monitoring values of the parameters; analyzing the monitoring values to detect monitored events, each monitored event of the monitored events being detected upon at least one monitored change between two or more respective monitoring values of the monitoring values of a respective parameter of the parameters that meets the event detection criterion; determining conformance of the monitored events with the process flow strings; and upon determining a lack of conformance of one of the monitored events with any one of the process flow strings, detecting the abnormal process flow.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing", "monitoring", "obtaining", "analyzing", "determining", "detecting", "generating", "recognizing", "performing", "removing", "verifying", "updating" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field-programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "an additional example", "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
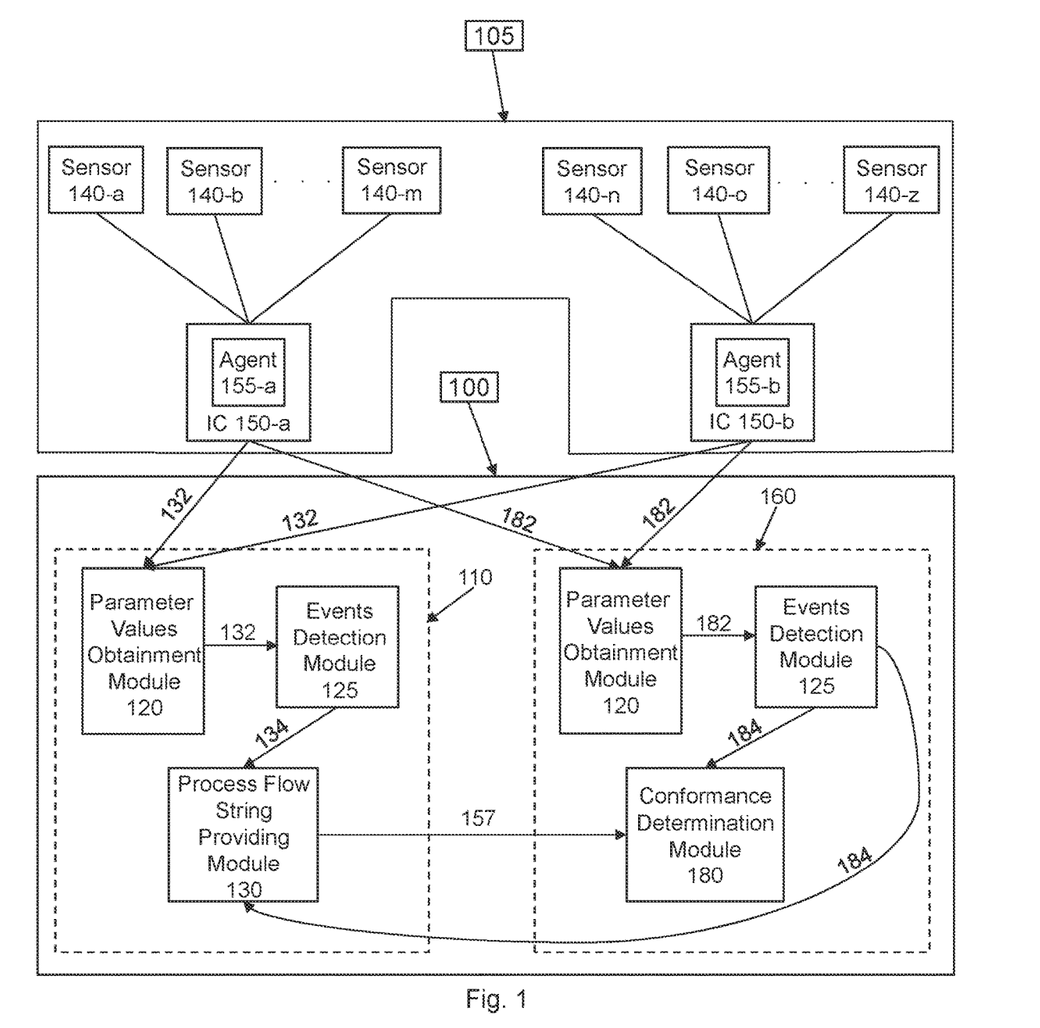
FIG. 1 is a block diagram schematically illustrating one example of an operation of a process flow abnormality detection system, in accordance with the presently disclosed subject matter.
Figure 2:
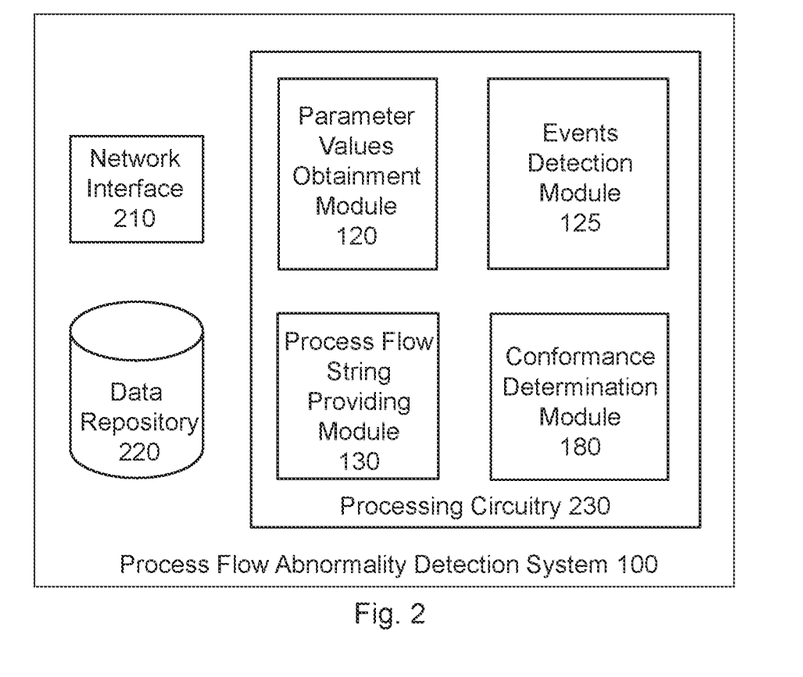
FIG. 2 is a block diagram schematically illustrating one example of a process flow abnormality detection system, in accordance with the presently disclosed subject matter.
Figure 3:
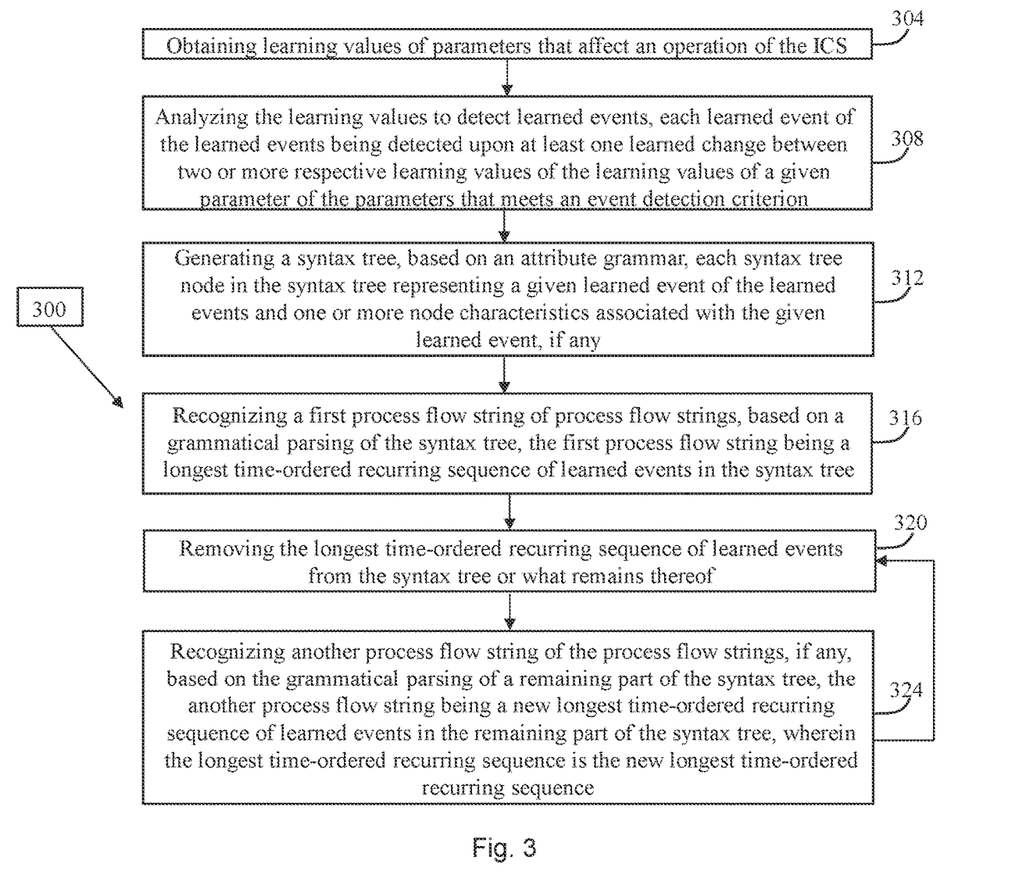
FIG. 3 is a flowchart illustrating one example of a sequence of operations for recognizing process flow strings that define normal process flows for processes in an Industrial Control System (ICS), in accordance with the presently disclosed subject matter.
Figure 4:
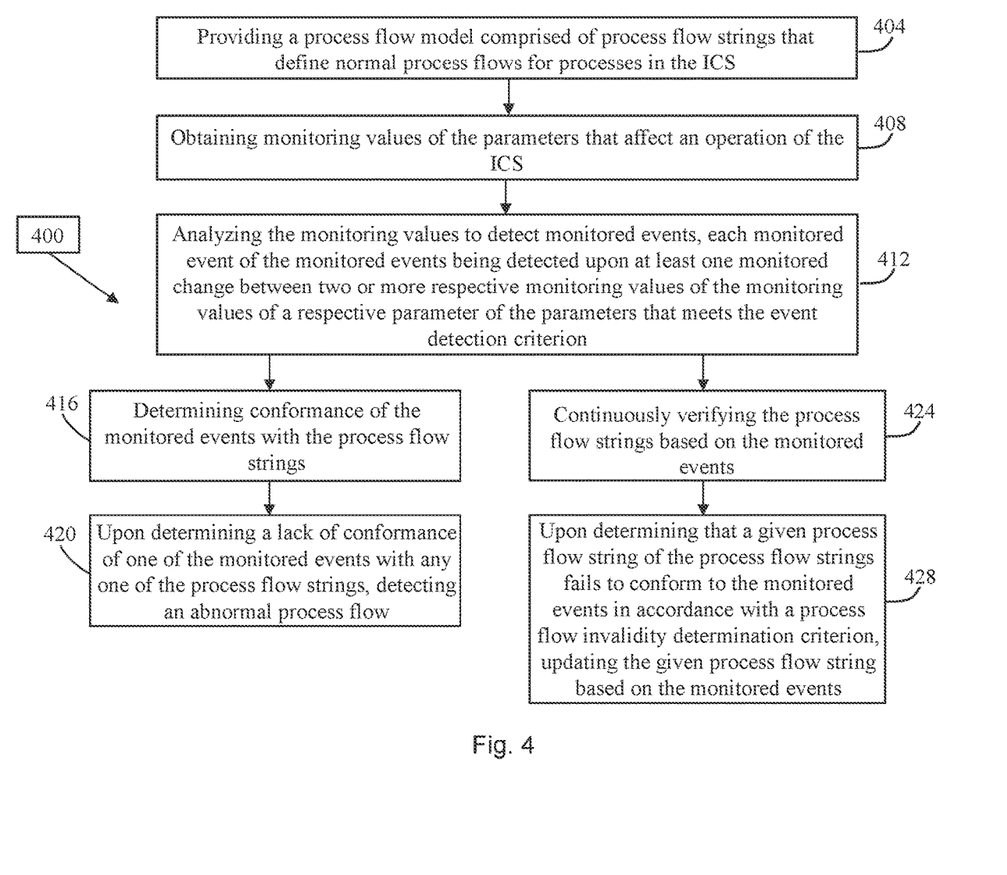
FIG. 4 is a flowchart illustrating one example of a sequence of operations for automatically detecting an abnormal process flow for a process in an ICS, in accordance with the presently disclosed subject matter.

In embodiments of the presently disclosed subject matter, fewer, more and/or different stages than those shown in FIGS. 3 and 4 may be executed. In embodiments of the presently disclosed subject matter one or more stages illustrated in FIGS. 3 and 4 may be executed in a different order and/or one or more groups of stages may be executed simultaneously. FIGS. 1 and 2 illustrate a general schematic of the system architecture in accordance with embodiments of the presently disclosed subject matter. Each module in FIGS. 1 and 2 can be made up of any combination of software, hardware and/or firmware that performs the functions as defined and explained herein. The modules in FIGS. 1 and 2 may be centralized in one location or dispersed over more than one location. In other embodiments of the presently disclosed subject matter, the system may comprise fewer, more, and/or different modules than those shown in FIGS. 1 and 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Attention is now drawn to FIG. 1, a block diagram schematically illustrating one example of an operation of a process flow abnormality detection system 100, in accordance with the presently disclosed subject matter.

In accordance with the presently disclosed subject matter, process flow abnormality detection system 100 can be configured to automatically monitor process flows of processes in an industrial control system (ICS) 105 to detect whether the process flows are normal or abnormal, as detailed below, including, inter alia, with reference to FIG. 4. In order to detect whether the process flows are normal or abnormal, process flow abnormality detection system 100 provides a process flow model comprised of process flow strings that define normal process flows for the processes in the ICS 105. Process flow abnormality detection system 100 provides an initial process flow model including an initial set of process flow strings before monitoring of the process flows begins, thereby enabling the monitoring of the process flows to begin. In some cases, process flow abnormality detection system 100 can be configured to recognize the initial set of process flow strings, by process flow string recognition module 110, as detailed below, inter alia with reference to FIG. 2. Alternatively, in some cases, an external computing entity (not shown), external to the process flow abnormality detection system 100, can be configured to recognize the initial set of process flow strings, by process flow string recognition module 110, and process flow abnormality detection system 100 can be configured to obtain the initial set from the external computing entity.

In some cases, process flow abnormality detection system 100 can be configured, by process flow string recognition module 110, to update the process flow model with an updated set of process flows strings, e.g. continuously or occasionally, while monitoring the process flows. For example, process flow abnormality detection system 100 can be configured to update the process flow model in response to an increase in a number of abnormal process flows that is indicative of a degradation in the quality of the existing process flow model. In some cases, process flow abnormality detection system 100 can be configured to update a given process flow string of the process flow strings while monitoring the process flows, as detailed below, including, inter alia, with reference to FIG. 4.

Process flow string recognition module 110 can be configured to include a parameter values obtainment module 120, an events detection module 125, and a process flow string providing module 130.

Process flow string recognition module 110 can be configured, using parameter values obtainment module 120, to obtain learning values 132 of parameters that affect an operation of the ICS 105. Some or all of the parameters are sensed by sensors (e.g., 140-*a*, 140-*b*, 140-*m*, 140-*n*, 140-*o*, . . . , 140-*z*) in the ICS 105. In some cases, one or more of the parameters are provided by one or more external sources, and the learning values 132 of these parameters can be obtained, by parameter values obtainment module 120, from the external sources. An example of an external source that provides at least one parameter is an external server that provides current weather conditions or pollution levels based on GPS coordinates.

ICS 105 can be configured to include one or more industrial controllers (e.g., 150-*a*, 150-*b*). One or more of the industrial controllers (e.g., 150-*a*, 150-*b*) can be configured to obtain the learning values 132 of the parameters that are sensed by the sensors (e.g., 140-*a*, 140-*b*, . . . , 140-*m*, 140-*n*, 140-*o*, . . . , 140-*z*) in the ICS 105, and to provide these learning values 132 to the parameter values obtainment module 120. In FIG. 1, which illustrates a non-limiting example of an ICS 105, industrial controller 150-*a* obtains the learning values 132 of the parameters that are sensed by sensors 140-*a*, 140-*b*, . . . , 140-*m*, and industrial controller 150-*b* obtains the learning values 132 of the parameters that are sensed by sensors 140-*n*, 140-*o*, . . . , 140-*z*. As illustrated in FIG. 1, the industrial controllers 150-*a* and 150-*b* provide the learning values 132 of the parameters that are sensed by the sensors (e.g., 140-*a*, 140-*b*, . . . , 140-*m*, 140-*n*, 140-*o*, . . . , 140-*z*) in the ICS 105 to parameter values obtainment module 120.

In some cases, at least some of the industrial controllers (e.g., 150-*a*, 150-*b*) in the ICS 105 can have an agent installed thereon. For example, in FIG. 1, an agent 155-*a* is installed on industrial controller 150-*a*, and an agent 155-*b* is installed on industrial controller 150-*b*. The agents (e.g., 155-*a*, 155-*b*) that are installed on the at least some of the industrial controllers (e.g., 150-*a*, 150-*b*) can be configured to obtain at least some of the learning values 132 of the parameters that are sensed by the sensors (e.g., 140-*a*, 140-*b*, . . . , 140-*m*, 140-*n*, 140-*o*, . . . , 140-*z*) in the ICS 105, and to provide these learning values 132 to parameter values obtainment module 120. In the non-limiting example of the ICS 105 in FIG. 1, the agent 155-*a* is configured to obtain the learning values 132 of the parameters that are sensed by sensors 140-*a*, 140-*b*, . . . , 140-*m*, and to provide these learning values 132 to the parameter values obtainment module 120. Moreover, the agent 155-*b* is configured to obtain the learning values 132 of the parameters that are sensed by sensors 140-*n*, 140-*o*, . . . , 140-*z*, and to provide these learning values 132 to the parameter values obtainment module 120.

The parameters can include, for example, one or more of: fixed parameters, enumerable parameters, or variable parameters.

Each fixed parameter has a plurality of possible fixed values, being possible statuses of the respective fixed parameter. An example of a fixed parameter is an operating status of a heating boiler. For example, an operating status of a heating boiler can be one of three possible statuses: operating (e.g., ON), not operating (e.g., OFF), or indeterminable (e.g., ERROR).

Each enumerable parameter has a plurality of possible categorical parameter values, being possible statuses of the respective enumerable parameter. Each categorical parameter value of the possible categorical parameter values is associated with a respective cluster of sensed values. An example of an enumerable parameter is a speed level of a motor that is capable of revolving at four different speed levels (e.g., speed levels 0, 1, 2 and 3), the different speed levels being the possible categorical parameter values, wherein each speed level is associated with a range of speeds of the motor (i.e., a respective cluster of speed values). For example, the motor can revolve at a speed between 0-100 revolutions per minute (RPM), 900-1200 RPM, 1800-2300 RPM and 2600-3500 RPM only. In this example, a first possible speed level of the motor (e.g., speed level 0) indicates that the motor revolves at a speed between 0-100 RPM; a second possible speed level of the motor (e.g., speed level 1) indicates that the motor revolves at a speed between 900-1200 RPM; a third possible speed level of the motor (e.g., speed level 2) indicates that the motor revolves at a speed between 1800-2300 RPM; and a fourth possible speed level of the motor (e.g., speed level 3) indicates that the motor revolves at a speed between 2600-3500 RPM.

Each variable parameter can have continuous values. Examples of variable parameters are temperature, pressure, water flow, electrical current, gas concentration, etc.

Process flow string recognition module 110 can be configured, using events detection module 125, to detect learned events 134, based on the learning values 132, as detailed further herein, inter alia with reference to FIG. 3.

Process flow string recognition system 110 can be further configured, e.g. using process flow string providing module 130, to recognize process flow strings 157 that define normal process flows for processes in the ICS 105, based on the learned events 134, as detailed further herein, inter alia with reference to FIG. 3. Each process flow string of the process flow strings 157 defines a time-ordered sequence of events (e.g., events A, B, D, C and E, in this order) that is a time-ordered recurring sequence of learned events 134. In some cases, a respective process flow string of the process flow strings 157 can be an attributed process flow string, being a process flow string in which at least one of the events therein is attributed, as detailed further herein, inter alia with reference to FIG. 3.

Process flow abnormality detection system 100 can be configured to include a monitoring module 160. Monitoring module 160 can be configured to monitor process flows of the processes in the ICS 105. Monitoring module 160 can be configured to include parameter values obtainment module 120, events detection module 125, and a conformance determination module 180.

Monitoring module 160 can be configured, using parameter values obtainment module 120, to obtain monitoring values 182 of the parameters that affect the operation of the ICS 105 while monitoring the process flows of the processes in the ICS 105. In some cases, one or more of the parameters can be provided by one or more external sources, as noted above, and the monitoring values 182 of these parameters can be obtained, by parameter values obtainment module 120, from the external sources.

In some cases, as noted above, process flow abnormality detection system 100 can be configured, by process flow string recognition module 110, to update the process flow model to comprise an updated set of process flows strings, while monitoring the process flows of the processes in the ICS 105 based on the obtained monitoring values 182. In such cases, the monitoring values 182 can be the learning values 132 based on which the process flow model is updated.

One or more of the industrial controllers (e.g., 150-*a*, 150-*b*) can be configured to obtain the monitoring values 182 of the parameters that are sensed by the sensors (e.g., 140-*a*, 140-*b*, . . . , 140-*m*, 140-*n*, 140-*o*, . . . , 140-*z*) in the ICS 105, and to provide these monitoring values 182 to parameter values obtainment module 120. In FIG. 1, which illustrates a non-limiting example of an ICS 105, industrial controller 150-*a* obtains the monitoring values 182 of the parameters that are sensed by sensors 140-*a*, 140-*b*, . . . , 140-*m*, and industrial controller 150-*b* obtains the monitoring values 182 of the parameters that are sensed by sensors 140-*n*, 140-*o*, . . . , 140-*z*. As illustrated in FIG. 1, the industrial controllers 150-*a* and 150-*b* provide the monitoring values 182 of the parameters that are sensed by the sensors (e.g., 140-*a*, 140-*b*, . . . , 140-*m*, 140-*n*, 140-*o*, . . . , 140-*z*) in the ICS 105 to parameter values obtainment module 120.

In some cases, in which an agent (e.g., 155-*a*, 155-*b*) is installed on at least some of the industrial controllers (e.g., 150-*a*, 150-*b*) in the ICS 105, the agents (e.g., 155-*a*, 155-*b*) that are installed on the at least some of the industrial controllers (e.g., 150-*a*, 150-*b*) can be configured to obtain at least some of the monitoring values 182 of the parameters that are sensed by the sensors (e.g., 140-*a*, 140-*b*, . . . , 140-*m*, 140-*n*, 140-*o*, . . . , 140-*z*) in the ICS 105, and to provide these monitoring values 182 to parameter values obtainment module 120. In the non-limiting example of the ICS 105 in FIG. 1, the agent 155-*a* is configured to obtain the monitoring values 182 of the parameters that are sensed by sensors 140-*a*, 140-*b*, . . . , 140-*m*, and to provide these monitoring values 182 to parameter values obtainment module 120. Moreover, the agent 155-*b* is configured to obtain the monitoring values 182 of the parameters that are sensed by sensors 140-*n*, 140-*o*, . . . , 140-*z*, and to provide these monitoring values 182 to parameter values obtainment module 120.

Monitoring module 160 can be configured, e.g. using events detection module 125, to detect monitored events 184, based on the monitoring values 182, as detailed further herein, inter alia with reference to FIG. 4.

Monitoring module 160 can be further configured, e.g. using conformance determination module 180, to determine conformance of the monitored events 184 with the process flow strings 157, and, upon determining a lack of conformance of one of the monitored events 184 with any one of the process flow strings 157, to detect an abnormal process flow, as detailed further herein, inter alia with reference to FIG. 4.

In some cases, process flow abnormality detection system 100 can be configured, e.g. using process flow string providing module 130, to continuously verify the process flow strings 157 based on the monitored events 184, as illustrated in FIG. 1, and as detailed further herein, inter alia with reference to FIG. 4. Moreover, upon determining that a given process flow string of the process flow strings 157 fails to conform to the monitored events 184 in accordance with a process flow invalidity determination criterion, process flow abnormality detection system 100 can be configured, e.g. using process flow string providing module 130, to update the given process flow string based on the monitored events 184.

Attention is now drawn to FIG. 2, a block diagram schematically illustrating one example of a process flow abnormality detection system 100, in accordance with the presently disclosed subject matter.

In accordance with the presently disclosed subject matter, process flow abnormality detection system 100 comprises a network interface 210 that is configured to connect the process flow abnormality detection system 100 to a communications network, through which the process flow abnormality detection system 100 can connect to other computerized devices, including, inter alia, other computerized devices in an industrial control system (ICS). The network interface 210 can be configured to enable the process flow abnormality detection system 100 to send data and receive data sent thereto through the communications network.

Process flow abnormality detection system 100 also comprises, or is otherwise associated with, a data repository 220 (e.g. a database, a storage system, a memory including Read Only Memory—ROM, Random Access Memory—RAM, or any other type of memory, etc.) configured to store data, including, inter alia, one or more process flow strings, and optionally a syntax tree based upon which the one or more process flow strings can be provided. Data repository 220 can be further configured to enable retrieval and/or updating and/or deletion of the stored data. It is to be noted that in some cases, data repository 220 can be distributed, while the process flow abnormality detection system 100 has access to the information stored thereon, e.g., via a wired or wireless network to which process flow abnormality detection system 100 is able to connect (utilizing its network interface 210).

Process flow abnormality detection system 100 also comprises a processing circuitry 230. Processing circuitry 230 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant process flow abnormality detection system 100 resources and for enabling operations related to process flow abnormality detection system 100 resources.

Processing circuitry 230 can be configured to include parameter values obtainment module 120, events detection module 125, process flow string providing module 130, and conformance determination module 180.

Process flow abnormality detection system 100 can be configured, e.g. using parameter values obtainment module 120, to obtain parameter values of parameters that affect an operation of the ICS 105.

In some cases, in which the process flow abnormality detection system 100 is learning events to recognize process flow strings 157, whether an initial set of process flow strings or an updated set of process flow strings, process flow abnormality detection system 100 can be configured, e.g. using parameter values obtainment module 120, to obtain learning values 132 of the parameters.

Process flow abnormality detection system 100 can also be configured, e.g. using parameter values obtainment module 120, to obtain monitoring values 182 of the parameters while monitoring the process flows of the processes in the ICS 105.

Process flow abnormality detection system 100 can be configured, e.g. using events detection module 125, to detect events, based on the parameter values of the parameters that affect the operation of the ICS 105.

In some cases, process flow abnormality detection system 100 can be configured, e.g. using events detection module 125, to detect learned events 134, based on the learning values 132, as detailed further herein, inter alia with reference to FIG. 3.

Process flow abnormality detection system 100 can also be configured, e.g. using events detection module 125, to detect monitored events 184, based on the monitoring values 182, as detailed further herein, inter alia with reference to FIG. 4.

Process flow abnormality detection system 100 can be configured, in some cases, e.g. using process flow string providing module 130, to recognize process flow strings 157 based on the learned events 134, as detailed further herein, inter alia with reference to FIG. 3.

In some cases, process flow abnormality detection system 100 can be configured, e.g. using process flow string providing module 130, to obtain process flow strings 157 (i.e., an initial set of process flow strings 157) from an external computing entity, external to the process flow abnormality detection system 100.

Process flow abnormality detection system 100 can be configured, e.g. using conformance determination module 180, to determine conformance of the monitored events 184 with the process flow strings 157, and, upon determining a lack of conformance of one of the monitored events 184 with any one of the process flow strings 157, to detect an abnormal process flow of a process in the ICS 105, as detailed further herein, inter alia with reference to FIG. 4.

Attention is now drawn to FIG. 3, a flowchart illustrating one example of a sequence of operations for recognizing process flow strings 157 that define normal process flows for processes in an Industrial Control System (ICS) 105, in accordance with the presently disclosed subject matter.

In accordance with the presently disclosed subject matter, in some cases, process flow abnormality detection system 100 can be configured, e.g. using parameter values obtainment module 120, to obtain learning values 132 of parameters that affect an operation of the ICS 105, as detailed earlier herein, inter alia with reference to FIG. 1 (block 304).

Process flow abnormality detection system 100 can also be configured, e.g. using events detection module 125, to analyze the learning values 132 to detect learned events 134, each learned event of the learned events 134 being detected upon at least one learned change between two or more respective learning values 132 of the learning values 132 of a given parameter of the parameters that meets an event detection criterion (block 308).

For a given parameter that is a fixed parameter or an enumerable parameter, the event detection criterion can be a status change of a status of the given parameter between the respective learning values 132. The respective learning values 132 can be consecutive learning values 132 or non-consecutive learning values 132. For example, a given parameter can be a state of a given machine in a plant, wherein the machine is generally operating during plant operating hours (e.g., between 9 AM and 6 PM on weekdays) and not operating during plant non-operating hours. In this case, the respective learning values 132 can represent a state of the machine during daily plant operating hours on two successive days.

For a given parameter that is a variable parameter, the event detection criterion can be that the at least one learned change between the two or more respective learning values 132 of the given parameter is statistically significant. The respective learning values 132 can be consecutive learning values 132 or non-consecutive learning values 132, as noted above.

In some cases, the at least one learned change can be statistically significant upon the at least one learned change resulting in at least one of the following: (a) a slope change between the respective learning values 132 of the given parameter that is greater than a statistically significant slope change, (b) an amplitude change between the respective learning values 132 of the given parameter that is greater than a statistically significant amplitude change, (c) a number of consecutive changes in the respective learning values 132 of the given parameter that is greater than a statistically significant number of consecutive changes (e.g., four or more consecutive changes in the respective learning values 132 may be considered to be a learned event 134), or (d) a rate of changes in the respective learning values 132 of the given parameter that is greater than a statistically significant change rate (e.g., 37 or more changes per second in the respective learning values 132 may be considered to be a learned event 134). In some cases, the amplitude change or the slope change can be calculated between consecutive learning values 132 of the given parameter. Alternatively, in some cases, the amplitude change or the slope change can be calculated between non-consecutive learning values 132 of the given parameter.

In some cases, one or more of the parameters can be dependent parameters that are dependent on an independent parameter of the parameters. Put differently, the independent parameter and the dependent parameters are interdependent. For example, a water pump can be controlled by a direct current (DC) motor. Generally, increasing the voltage that is applied to the DC motor results in a corresponding increase in a motor speed of the DC motor and a corresponding increase in the water flow of the water that is pumped by the water pump. Likewise, decreasing the voltage that is applied to the DC motor results in a corresponding decrease in a motor speed of the DC motor and a corresponding decrease in the water flow of the water that is pumped by the water pump. In this example, the voltage is an independent parameter, and the motor speed and the water flow are dependent parameters that are dependent on the voltage.

In some cases, in which a given parameter of the parameters and another parameter of the parameters are interdependent, the event detection criterion can be a statistically significant discrepancy between a learned change between respective learning values 132 of the given parameter and another learned change or lack of change between corresponding learning values 132 of the another parameter, the corresponding learning values 132 corresponding to, but not necessarily time-overlapping with, the respective learning values 132.

To illustrate that the corresponding learning values 132 need not be time-overlapping with the respective learning values 132, consider the situation in which at least one sensor in a huge water pool senses that a water level of the water pool needs to be increased. This results in a communication being sent to water suppliers (e.g., water wells) to fill in the water pool. Since the water suppliers are generally several miles away, and since it takes time to pump water from the ground, it can take a significant amount of time between a first time at which the sensor in the water pool senses that the water level of the water pool needs to be increased and a second time at which the water pool is filled. Here, there is a time-delay between the respective learning values 132 of the water level of the water pool, the change therebetween indicating that the water level has dropped below a threshold water level, and the corresponding learning values 132 of the water flow of the water that is pumped by a water pump of a water supplier, the change therebetween being an increase in the water flow responsive to the water level of the water pool dropping below the threshold water level.

Process flow abnormality detection system 100 can be configured, e.g. using process flow string providing module 130, to generate a syntax tree, based on an attribute grammar, each syntax tree node in the syntax tree representing a given learned event 134 of the learned events 134 and one or more node characteristics associated with the given learned event 134, if any (block 312).

In some cases, one of the node characteristics that can be associated with a given learned event 134 can be a time of occurrence of the given learned event 134.

Additionally, or alternatively, in some cases, one of the attributes that can be associated with a given learned event 134 can be a slope (i.e., percentage change) of the at least one learned change between the respective learning values 132 that results in the occurrence of the given learned event 134.

Process flow abnormality detection system 100 can be configured, e.g. using process flow string providing module 130, to recognize a first process flow string of process flow strings 157, based on a grammatical parsing of the syntax tree, the first process flow string being a longest time-ordered recurring sequence of learned events 134 in the syntax tree (block 316).

Following recognition of the first process flow string, process flow abnormality detection system 100 can be configured, e.g. using process flow string providing module 130, to perform a sub-sequence identification process one or more times. The sub-sequence identification process can include removing the longest time-ordered recurring sequence of learned events 134 from the syntax tree or what remains thereof (block 320). Following the removal of the longest time-ordered recurring sequence of learned events 134 from the syntax tree or what remains thereof, the sub-sequence identification process can include recognizing another process flow string of the process flow strings 157, if any, based on the grammatical parsing of a remaining part of the syntax tree, the another process flow string being a new longest time-ordered recurring sequence of learned events 134 in the remaining part of the syntax tree, wherein the longest time-ordered recurring sequence is the new longest time-ordered recurring sequence in the next iteration of the sub-sequence identification process (block 324).

The sub-sequence identification process can be repeated until there are no time-ordered recurring sequences of learned events 134 to be recognized based on a grammatical parsing of the syntax tree.

Each process flow string of the process flow strings 157 includes a plurality of process flow nodes. Each process flow node in a respective process flow string of the process flow strings 157 represents a respective event of the events in the respective process flow string.

In some cases, one or more of the events in a respective process flow string can also be included in another process flow string of the process flow strings 157, different than the respective process flow string. For example, an event of switching on certain equipment can initiate multiple process flows simultaneously; such event will appear as a node in all of the process flow strings representing the multiple process flows.

For an event from which multiple process flows flow therefrom, removal of a respective process flow string of the process flow strings 157 that include the event, after the recognition of the respective process flow string, does not necessarily remove the event from the remaining syntax tree. The remaining process flow strings that include the event, if any, including the event itself, are retained in the syntax tree following the removal of the respective process flow string.

In some cases, at least one of the process flow nodes in a respective process flow string 157 can be an attributed process flow node that represents one or more attributes that are associated with an attributed event 134 that is represented by the attributed process flow node. Such attributes can be recognized by the grammatical parsing of the syntax tree, based upon which the process flow strings 157 are recognized, in accordance with node characteristics that are associated with the learned (attributed) event 134 that is represented by the attributed process flow node.

In some cases, one of the attributes that can be associated with an attributed event in a respective process flow string 157 can be a time duration range between the attributed event and a successive event in the respective process flow string 157, the successive event being immediately successive to the attributed event in the respective process flow string 157. The time duration range is indicative of a range of time durations between the attributed event and the successive event over iterations of the time-ordered recurring sequence of learned events 134 that is represented by the respective process flow string 157.

In some cases, the time duration range can reflect the time durations between the attributed event and the successive event over all of the iterations of the time-ordered recurring sequence of learned events 134 that is represented by the respective process flow string 157.

Alternatively, in some cases, the time duration range can be determined in accordance with a statistical analysis by fitting the time durations between the attributed event and the successive event over all of the iterations to a known distribution (e.g., a normal distribution). In some cases, the time duration range can be defined as a mean and a standard deviation of the time durations between the attributed event and the successive event over the iterations.

In some cases, one of the attributes that can be associated with an attributed event in a respective process flow string 157 can be a range of changes in slope between successive instances of the attributed event over iterations of the time-ordered recurring sequence of learned events 134 that is represented by the respective process flow string 157. A change in slope between successive instances of an attributed event over two successive iterations of the time-ordered recurring sequence of learned events 134 that is represented by the respective process flow string 157 is a relation between a slope (i.e., percentage change) of the at least one learned change between the respective learning values 132 that results in the occurrence of the attributed event 134 during a first iteration of the two successive iterations and a slope (i.e., percentage change) of the at least one learned change between the respective learning values 132 that results in the occurrence of the attributed event 134 during a second iteration of the two successive iterations.

In some cases, the range of changes in slope between successive instances of an attributed event 134 can reflect the changes in slopes between the successive instances of the attributed event 134 over all of the iterations of the time-ordered recurring sequence of learned events 134 that is represented by the respective process flow string 157. Alternatively, in some cases, the range of changes in slope can be determined in accordance with a statistical analysis by fitting the changes in slope between the successive instances of the attributed event 134 over all of the iterations to a known distribution (e.g., a normal distribution). In some cases, the range of changes in slope can be defined as a mean and a standard deviation of the changes in slope between the successive instances of the attributed event 134 over the iterations.

In some cases, a respective process flow string 157 can be non-deterministic. That is, at least one event in the respective process flow string 157 can be followed by one of at least two possible successive events, successive to the respective event. For example, a respective process flow string 157 can have the time-ordered sequence of events [A, B, D, C, E] eighty percent of the time and the time-ordered sequence of events [A, B, D, G, E] twenty percent of the time. In some cases, in which a respective event in a respective process flow string 157 is followed by one of at least two possible successive events, an attributed process flow node associated with the respective event can represent an attribute that is indicative of a probability of occurrence of each of the at least two possible successive events. With respect to the above-provided example, in which the respective process flow string has the time-ordered sequence of events [A, B, D, C, E] eighty percent of the time and the time-ordered sequence of events [A, B, D, G, E] twenty percent of the time, an attributed process flow node can be associated with the event D, the attributed process flow node representing an attribute that indicates that the probability that the event C follows the event D is eighty percent, and the probability that the event G follows the event D is twenty percent.

In some cases, an attributed process flow node that is associated with a respective event (e.g., event D) in a respective process flow string 157 can represent an attribute, other than a probability of occurrence, that indicates which of at least two possible successive events (e.g., events C and G), successive to the respective event (e.g., event D), in the respective process flow string 157 will occur. In some cases, the attribute that is represented by the respective event (e.g., event D) can be a range of changes in slope between successive instances of the respective event (e.g., event D) over the iterations of the time-ordered recurring sequence of learning events 132 that defines the respective process flow string 157. For example, for a first range of changes in slope between the successive instances of the respective event (e.g., event D), for example a range of 1.3-1.6, the successive event that is successive to the respective event (e.g., event D) is a first potential successive event (e.g., event C) of the potential successive events (e.g., events C and G). Moreover, for a second range of changes in slope between the successive instances of the respective event (e.g., event D), for example a range of 1.6-1.8, the successive event that is successive to the respective event (e.g., event D) is a second potential successive event (e.g., event G) of the potential successive events (e.g., events C and G).

It is to be noted that, in some cases, an external computing entity, external to the process flow abnormality detection system 100, can be configured to recognize the initial process flow strings, as detailed earlier herein, inter alia with reference to FIG. 1.

Attention is now drawn to FIG. 4, a flowchart illustrating one example of a sequence of operations 400 for automatically detecting an abnormal process flow of a process in an ICS 105, in accordance with the presently disclosed subject matter.

In accordance with the presently disclosed subject matter, process flow abnormality detection system 100 can be configured, e.g. using process flow string providing module 130, to provide a process flow model comprised of process flow strings 157 that define normal process flows for processes in the ICS 105 (block 404). In some cases, process flow abnormality detection system 100 can be configured to recognize the process flow strings 157, as detailed earlier herein, inter alia with reference to FIG. 3. Alternatively, in some cases, process flow abnormality detection system 100 can be configured to obtain the process flow strings 157 from an external computing entity, external to the process flow abnormality detection system 100, wherein the external computing entity recognizes the process flow strings 157, as detailed earlier herein, inter alia with reference to FIG. 1.

Process flow abnormality detection system 100 can be configured to monitor process flows of the processes as follows. Process flow abnormality detection system 100 can be configured, e.g. using parameter values obtainment module 120, to obtain monitoring values 182 of the parameters that affect an operation of the ICS 105 (block 408). The monitoring values 182 are obtained by the process flow abnormality detection system 100 following the recognition of an initial set of process flow strings 157 by the process flow abnormality detection system 100 or an external entity.

Process flow abnormality detection system 100 can be configured, e.g. using events detection module 125, to analyze the monitoring values 182 to detect monitored events 184, each monitored event of the monitored events 184 being detected upon at least one monitored change between two or more respective monitoring values 182 of the monitoring values 182 of a respective parameter of the parameters that meets the event detection criterion (block 412). The two or more respective monitoring values 182 can be consecutive monitoring values 182 or non-consecutive monitoring values 182, as detailed below.

For a respective parameter that is a fixed parameter or an enumerable parameter, the event detection criterion can be a status change of a status of the respective parameter between the respective monitoring values 182. The respective monitoring values 182 do not necessarily have to be consecutive monitoring values 182, as noted above. For example, a respective parameter can be a state of a given machine in a plant, wherein the machine is generally operating during plant operating hours (e.g., between 9 AM and 6 PM on weekdays) and not operating during plant non-operating hours. In this case, the respective monitoring values 182 can represent a state of the machine during daily plant operating hours on two successive days.

For a respective parameter that is a variable parameter, the event detection criterion can be that the at least one monitored change between the two or more respective monitoring values 182 of the respective parameter is statistically significant. The respective monitoring values 182 do not necessarily have to be consecutive monitoring values 182, as noted above.

In some cases, the at least one monitored change can be statistically significant upon the at least one monitored change resulting in at least one of the following: (a) a slope change between the respective monitoring values 182 of the respective parameter that is greater than a statistically significant slope change, (b) an amplitude change between the respective monitoring values 182 of the respective parameter that is greater than a statistically significant amplitude change, (c) a number of consecutive changes in the respective monitoring values 182 of the respective parameter that is greater than a statistically significant number of consecutive changes (e.g., four or more consecutive changes in the respective monitoring values 182 may be considered to be a monitored event 184), or (d) a rate of changes in the respective monitoring values 182 of the respective parameter that is greater than a statistically significant change rate (e.g., 37 or more changes per second in the respective monitoring values 182 may be considered to be a monitored event 184). In some cases, the amplitude change or the slope change can be calculated between consecutive monitoring values 182 of the respective parameter. Alternatively, in some cases, the amplitude change or the slope change can be calculated between non-consecutive monitoring values 182 of the respective parameter.

In some cases, in which a respective parameter and another parameter are interdependent, the event detection criterion can be a statistically significant discrepancy between a monitored change between respective monitoring values 182 of the respective parameter and another monitored change or lack of change between corresponding monitoring values 182 of the another parameter, the corresponding monitoring values 182 corresponding to, but not necessarily time-overlapping with, the respective monitoring values 182.

Process flow abnormality detection system 100 can be configured, e.g. using conformance determination module 180, to determine conformance of the monitored events 184 with the process flow strings 157 (block 416). In order for a current monitored event 184 to conform to a respective process flow string 157, the current monitored event 184 must appear in the time-ordered sequence of events that defines the respective process flow string 157 in the correct position within the time-ordered sequence and must be consistent with each attribute that is relevant to the current monitored event 184, if any, including, in some cases, one or more attributes associated with a preceding monitored event 184 that immediately precedes the current monitored event 184 in the time-ordered sequence of events that defines the respective process flow string 157, as detailed below.

To explain this, assume that a respective process flow string 157 defines a time-ordered sequence of events $[A^{1-100}B^{320-1000}C^{1-5}D]$, wherein A, B, C and D are the events, and wherein the superscripts are indicative of the time duration ranges in seconds between successive events of the events. In order for the monitored events 184 to conform to the respective process flow string 157, monitored event A must be detected; monitored event B must be detected between one second and 100 seconds after monitored event A; monitored event C must be detected between 320 seconds and 1000 seconds after monitored event B; and monitored event D must be detected between one second and five seconds after monitored event C.

Upon determining a lack of conformance of one of the monitored events 184 with any one of the process flow strings 157, process flow abnormality detection system 100 can be configured, e.g. using conformance determination module 180, to detect an abnormal process flow (block 420).

Returning to the respective process flow string 157 that defines the time-ordered sequence of events $[A^{1-100}B^{320-1000}C^{1-5}D]$, assume that monitored event A is detected and monitored event B is detected 43 seconds after monitored event A. This conforms to the respective process flow string since monitored event B is detected between one second and 100 seconds after monitored event A. Assume further that monitored event D is detected 475 seconds after monitored event B, without event C intervening between monitored event B and monitored event D. That is, assume the following partial time-ordered sequence of monitored events: $[A^{43}B^{475}D]$. In this case, the monitored event D does not conform to the respective process flow string 157, since it does not appear in the correct position in the time-ordered sequence of events defining the respective process flow string 157.

Now assume, with reference to the respective process flow string 157 that defines the time-ordered sequence of events $[A^{1-100}B^{320-1000}C^{1-5}D]$, that, as in the example above, monitored event A is detected and monitored event B is detected 43 seconds after monitored event A. Assume further that monitored event C is detected 475 seconds after monitored event B. This conforms to the respective process flow string 157 since monitored event C is detected between 320 seconds and 1000 seconds after monitored event B. In addition, assume that monitored event D is detected after monitored event C, as in the respective process flow string 157, but is detected 500 seconds after monitored event C, unlike the respective process flow string 157. That is, assume the following time-ordered sequence of monitored events 184: $[A^{43}B^{475}C^{500}D]$. In this case, the monitored event D does not conform to the respective process flow string 157 since it is inconsistent with the time duration range that is associated with the monitored event C.

In some cases, process flow abnormality detection system 100 can be configured, e.g. using process flow string providing module 130, to continuously verify the process flow strings 157 based on the monitored events 184 (block 424). Upon determining that a given process flow string 157 of the process flow strings 157 fails to conform to the monitored events 184 in accordance with a process flow invalidity determination criterion, process flow abnormality detection system 100 can be configured, e.g. using process flow string providing module 130, to update the given process flow string 157 based on the monitored events 184 (block 428). A given process flow string 157 is considered to fail to conform to the monitored events 184 in accordance with a process flow invalidity determination criterion if the given process flow string 157 is consistently and systematically inconsistent with the monitored events 184. For example, a given process flow string 157 can be consistently and systematically inconsistent with the monitored events 184 if an abnormal process flow of the given process flow string 157 is detected at a rate that is greater than a threshold rate over a given time period.

It is to be noted that, with reference to FIGS. 3 and 4, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A process flow abnormality detection system for automatically detecting an abnormal process flow for a process of processes in an industrial control system (ICS), the process flow abnormality detection system comprising a processing circuitry configured to:
provide a process flow model comprised of process flow strings that define normal process flows for the processes, wherein each process flow string of the process flow strings includes a sequence of characters that defines a time-ordered sequence of events that is a time-ordered recurring sequence of learned events, each learned event of the learned events being indicative of at least one learned change between two or more respective learning values of a respective parameter of parameters affecting an operation of the ICS that meets an event detection criterion, wherein each process flow node in a respective process flow string of the process flow strings represents a respective event of the events in the respective process flow string, and wherein an attributed process flow node of process flow nodes in the respective process flow string represents one or more attributes that are associated with an attributed event that is represented by the attributed process flow node; and
monitor process flows of the processes by:
obtaining monitoring values of the parameters;
analyzing the monitoring values to detect monitored events, each monitored event of the monitored events being detected upon at least one monitored change between two or more respective monitoring values of the monitoring values of a respective parameter of the parameters that meets the event detection criterion;
determining conformance of the monitored events with the process flow strings; and
upon determining a lack of conformance of one of the monitored events with any one of the process flow strings, detecting the abnormal process flow.

2. The process flow abnormality detection system of claim 1, wherein the respective parameter is a fixed parameter, an enumerable parameter having a plurality of categorical parameter values, or a variable parameter; wherein, for the respective parameter that is the fixed parameter or the enumerable parameter, the event detection criterion is a status change of a status of the respective parameter; and wherein, for the respective parameter that is the variable parameter, the event detection criterion is that the at least one learned change or the at least one monitored change is statistically significant.

3. The process flow abnormality detection system of claim 1, wherein another parameter of the parameters is interdependent with the respective parameter, and wherein (a) the event detection criterion is a statistically significant discrepancy between the learned change and another learned change or lack of change between corresponding learning values of the another parameter, the corresponding learning values corresponding to the respective learning values of the respective parameter, or (b) the event detection criterion is a statistically significant discrepancy between the monitored change and another monitored change or lack of change between corresponding monitoring values of the another parameter, the corresponding monitoring values corresponding to the respective monitoring values of the respective parameter.

4. The process flow abnormality detection system of claim 1, wherein one of the attributes that is associated with the attributed event is a time duration range between the attributed event and a successive event in the respective process flow string, the successive event being successive to the attributed event in the respective process flow string, and the time duration range being indicative of a range of time durations between the attributed event and the successive event over iterations of the time-ordered recurring sequence of learned events that is represented by the respective process flow string.

5. The process flow abnormality detection system of claim 4, wherein the time duration range is determined in accordance with a statistical analysis by fitting the time durations between the attributed event and the successive event over the iterations to a known distribution.

6. The process flow abnormality detection system of claim 1, wherein the processing circuitry is further configured to:
generate a syntax tree, based on an attribute grammar, each syntax tree node in the syntax tree representing a given learned event of the learned events and one or more node characteristics associated with the given learned event, if any.

7. The process flow abnormality detection system of claim 6, wherein the processing circuitry is configured to recognize a first process flow string of the process flow strings, based on a grammatical parsing of the syntax tree, the first process flow string being a longest time-ordered recurring sequence of learned events in the syntax tree.

8. The process flow abnormality detection system of claim 7, wherein the processing circuitry is further configured to perform a sub-sequence identification process one or more times, following recognition of the first process flow string, the sub-sequence identification process including:
removing the longest time-ordered recurring sequence of learned events from the syntax tree or what remains thereof; and
recognizing another process flow string of the process flow strings, if any, based on the grammatical parsing of a remaining part of the syntax tree, the another process flow string being a new longest time-ordered recurring sequence of learned events in the remaining part of the syntax tree, wherein the longest time-ordered recurring sequence is the new longest time-ordered recurring sequence.

9. The process flow abnormality detection system of claim 1, wherein the processing circuitry is further configured to:
continuously verify the process flow strings based on the monitored events; and
upon determining that a given process flow string of the process flow strings fails to conform to the monitored events in accordance with a process flow invalidity determination criterion, update the given process flow string based on the monitored events.

10. The process flow abnormality detection system of claim 1, wherein the processing circuitry is further configured to:
update the process flow model to comprise an updated set of process flow strings while monitoring the process flows.

11. A process flow abnormality detection method for automatically detecting an abnormal process flow for a process of processes in an industrial control system (ICS), the process flow abnormality detection method comprising:

providing a process flow model comprised of process flow strings that define normal process flows for the processes, wherein each process flow string of the process flow strings includes a sequence of characters that defines a time-ordered sequence of events that is a time-ordered recurring sequence of learned events, each learned event of the learned events being indicative of at least one learned change between two or more respective learning values of a respective parameter of parameters affecting an operation of the ICS that meets an event detection criterion, wherein each process flow node in a respective process flow string of the process flow strings represents a respective event of the events in the respective process flow string, and wherein an attributed process flow node of process flow nodes in the respective process flow string represents one or more attributes that are associated with an attributed event that is represented by the attributed process flow node; and monitoring process flows of the processes by:
 obtaining monitoring values of the parameters;
 analyzing the monitoring values to detect monitored events, each monitored event of the monitored events being detected upon at least one monitored change between two or more respective monitoring values of the monitoring values of a respective parameter of the parameters that meets the event detection criterion;
 determining conformance of the monitored events with the process flow strings; and
 upon determining a lack of conformance of one of the monitored events with any one of the process flow strings, detecting the abnormal process flow.

12. The process flow abnormality detection method of claim 11, wherein the respective parameter is a fixed parameter, an enumerable parameter having a plurality of categorical parameter values, or a variable parameter; wherein, for the respective parameter that is the fixed parameter or the enumerable parameter, the event detection criterion is a status change of a status of the respective parameter; and wherein, for the respective parameter that is the variable parameter, the event detection criterion is that the at least one learned change or the at least one monitored change is statistically significant.

13. The process flow abnormality detection method of claim 11, wherein another parameter of the parameters is interdependent with the respective parameter, and wherein (a) the event detection criterion is a statistically significant discrepancy between the learned change and another learned change or lack of change between corresponding learning values of the another parameter, the corresponding learning values corresponding to the respective learning values of the respective parameter, or (b) the event detection criterion is a statistically significant discrepancy between the monitored change and another monitored change or lack of change between corresponding monitoring values of the another parameter, the corresponding monitoring values corresponding to the respective monitoring values of the respective parameter.

14. The process flow abnormality detection method of claim 11, wherein one of the attributes that is associated with the attributed event is a time duration range between the attributed event and a successive event in the respective process flow string, the successive event being successive to the attributed event in the respective process flow string, and the time duration range being indicative of a range of time durations between the attributed event and the successive event over iterations of the time-ordered recurring sequence of learned events that is represented by the respective process flow string.

15. The process flow abnormality detection method of claim 14, wherein the time duration range is determined in accordance with a statistical analysis by fitting the time durations between the attributed event and the successive event over the iterations to a known distribution.

16. The process flow abnormality detection method of claim 11, further comprising: generating a syntax tree, based on an attribute grammar, each syntax tree node in the syntax tree representing a given learned event of the learned events and one or more node characteristics associated with the given learned event, if any.

17. The process flow abnormality detection method of claim 16, further comprising:
 recognizing a first process flow string of the process flow strings, based on a grammatical parsing of the syntax tree, the first process flow string being a longest time-ordered recurring sequence of learned events in the syntax tree; and
 performing a sub-sequence identification process one or more times, following recognition of the first process flow string, the sub-sequence identification process including:
  removing the longest time-ordered recurring sequence of learned events from the syntax tree or what remains thereof; and
  recognizing another process flow string of the process flow strings, if any, based on the grammatical parsing of a remaining part of the syntax tree, the another process flow string being a new longest time-ordered recurring sequence of learned events in the remaining part of the syntax tree, wherein the longest time-ordered recurring sequence is the new longest time-ordered recurring sequence.

18. The process flow abnormality detection method of claim 11, further comprising:
 continuously verifying the process flow strings based on the monitored events; and
 upon determining that a given process flow string of the process flow strings fails to conform to the monitored events in accordance with a process flow invalidity determination criterion, updating the given process flow string based on the monitored events.

19. The process flow abnormality detection method of claim 11, further comprising:
 updating the process flow model to comprise an updated set of process flow strings while monitoring the process flows.

20. A non-transitory computer readable storage medium having computer readable program code embodied therewith, the computer readable program code, executable by a processing circuitry of a computer to perform a process flow abnormality detection method for automatically detecting an abnormal process flow for a process of processes in an industrial control system (ICS), the process flow abnormality detection method comprising:
 providing a process flow model comprised of process flow strings that define normal process flows for the processes, wherein each process flow string of the process flow strings includes a sequence of characters that defines a time-ordered sequence of events that is a time-ordered recurring sequence of learned events, each learned event of the learned events being indicative of at least one learned change between two or more respective learning values of a respective parameter of parameters affecting an operation of the ICS that meets an event detection criterion, wherein each process flow node in a respective process flow string of the process flow strings represents a respective event of the events in the respective process flow string, and wherein an attributed process flow node of process flow nodes in the respective process flow string represents one or more attributes that are associated with an attributed event that is represented by the attributed process flow node; and monitoring process flows of the processes by:
    obtaining monitoring values of the parameters;
    analyzing the monitoring values to detect monitored events, each monitored event of the monitored events being detected upon at least one monitored change between two or more respective monitoring values of the monitoring values of a respective parameter of the parameters that meets the event detection criterion;
    determining conformance of the monitored events with the process flow strings; and
    upon determining a lack of conformance of one of the monitored events with any one of the process flow strings, detecting the abnormal process flow.

* * * * *